United States Patent
Hiraiwa et al.

(10) Patent No.: US 10,084,191 B2
(45) Date of Patent: Sep. 25, 2018

(54) SOLID ELECTROLYTE LAMINATE, METHOD FOR MANUFACTURING SOLID ELECTROLYTE LAMINATE, AND FUEL CELL

(71) Applicant: SUMITOMO ELECTRIC INDUSTRIES, LTD., Osaka-shi, Osaka (JP)

(72) Inventors: Chihiro Hiraiwa, Itami (JP); Masatoshi Majima, Itami (JP); Atsushi Yamaguchi, Itami (JP); Naho Mizuhara, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 463 days.

(21) Appl. No.: 14/400,917

(22) PCT Filed: Apr. 26, 2013

(86) PCT No.: PCT/JP2013/062369
§ 371 (c)(1),
(2) Date: Nov. 13, 2014

(87) PCT Pub. No.: WO2013/172182
PCT Pub. Date: Nov. 21, 2013

(65) Prior Publication Data
US 2015/0147674 A1    May 28, 2015

(30) Foreign Application Priority Data

May 15, 2012  (JP) .................................. 2012-111150

(51) Int. Cl.
*H01M 8/24* (2016.01)
*H01M 4/90* (2006.01)
(Continued)

(52) U.S. Cl.
CPC ......... *H01M 4/905* (2013.01); *H01M 4/8621* (2013.01); *H01M 8/0232* (2013.01);
(Continued)

(58) Field of Classification Search
CPC . H01M 2004/8684; H01M 2008/1095; H01M 2008/1293; H01M 2300/0082;
(Continued)

(56) References Cited

U.S. PATENT DOCUMENTS 5,981,048 A * 11/1999 Sugimoto ............... B32B 27/32
428/213
2003/0219639 A1* 11/2003 Edlund ............... H01M 8/0206
429/423

(Continued)

FOREIGN PATENT DOCUMENTS

CN    1971990 A    5/2007
JP    H10-172590 A    6/1998
(Continued)

OTHER PUBLICATIONS

T. Ishihara, et al., "High Power SOFC using LaGaO₃ Based Oxide Electrolyte Film Prepared on Porous Metal Substrate", ECS Transactions 7(1), pp. 435-442, 2007.

*Primary Examiner* — Lingwen R Zeng
(74) *Attorney, Agent, or Firm* — Drinker Biddle & Reath LLP

(57) ABSTRACT

An object is to provide a solid electrolyte laminate that allows a large amount of gas to be supplied to a fuel electrode while having improved strength and a method for manufacturing such a solid electrolyte laminate. A solid electrolyte laminate 1 includes a solid electrolyte layer 2, a first electrode layer 3 disposed on one side of the solid electrolyte layer, and a second electrode layer 4 disposed on another side of the solid electrolyte layer. At least the first (Continued)

electrode layer, which forms a fuel electrode, includes a bonding layer 3a bonded to the solid electrolyte layer and a porous layer 3b having continuous pores and integrally formed on the bonding layer.

9 Claims, 2 Drawing Sheets

(51) Int. Cl.
H01M 8/1213 (2016.01)
H01M 8/1246 (2016.01)
H01M 4/86 (2006.01)
H01M 8/1004 (2016.01)
H01M 8/2485 (2016.01)
H01M 8/0232 (2016.01)
H01M 8/1018 (2016.01)
H01M 8/1253 (2016.01)
H01M 8/124 (2016.01)

(52) U.S. Cl.
CPC ....... *H01M 8/1004* (2013.01); *H01M 8/1213* (2013.01); *H01M 8/1246* (2013.01); *H01M 8/2485* (2013.01); *H01M 4/9066* (2013.01); *H01M 8/1253* (2013.01); *H01M 2004/8684* (2013.01); *H01M 2008/1095* (2013.01); *H01M 2008/1293* (2013.01); *H01M 2300/0082* (2013.01); *Y02E 60/525* (2013.01); *Y02P 70/56* (2015.11); *Y10T 156/10* (2015.01)

(58) Field of Classification Search
CPC .. H01M 4/8621; H01M 4/905; H01M 4/9066; H01M 8/0232; H01M 8/1004; H01M 8/1213; H01M 8/1246; H01M 8/1253; H01M 8/2485; Y02E 60/525; Y02P 70/56; Y10T 156/10
See application file for complete search history.

(56) References Cited

U.S. PATENT DOCUMENTS

| | | | |
|---|---|---|---|
| 2004/0121222 A1 | 6/2004 | Sarkar et al. | |
| 2005/0095497 A1* | 5/2005 | Yamada | H01M 4/8621 |
| | | | 429/483 |
| 2007/0015015 A1* | 1/2007 | Hoshino | C01B 3/38 |
| | | | 429/425 |
| 2009/0218311 A1 | 9/2009 | Jiang et al. | |

FOREIGN PATENT DOCUMENTS

| | | |
|---|---|---|
| JP | 2005-203257 A | 7/2005 |
| JP | 3733030 B2 | 1/2006 |
| JP | 2007-059257 A | 3/2007 |
| JP | 2007-165143 A | 6/2007 |
| JP | 2007-523441 A | 8/2007 |
| JP | 2007-531974 A | 11/2007 |
| JP | 2008-004422 A | 1/2008 |
| JP | 2008-053194 A | 3/2008 |
| JP | 2010-123297 A | 6/2010 |
| JP | 2011-526666 A | 10/2011 |
| JP | 2011-228280 A | 11/2011 |
| JP | 2011-255285 A | 12/2011 |
| JP | 2012-016693 A | 1/2012 |
| JP | 2012-028088 A | 2/2012 |
| JP | 2012-054137 A | 3/2012 |
| WO | WO 2006/030590 A1 | 3/2006 |
| WO | WO 2010/095728 A1 | 8/2010 |
| WO | WO 2012/002309 A1 | 1/2012 |

* cited by examiner

SOLID ELECTROLYTE LAMINATE, METHOD FOR MANUFACTURING SOLID ELECTROLYTE LAMINATE, AND FUEL CELL

TECHNICAL FIELD

The present invention relates to solid electrolyte laminates, methods for manufacturing solid electrolyte laminates, and fuel cells. Specifically, the present invention relates to a solid electrolyte laminate that has low resistance to the flow of a fuel gas through a fuel electrode and thus allows a large amount of fuel gas to react on the fuel electrode, and also relates to a method for manufacturing such a solid electrolyte laminate.

BACKGROUND ART

Solid oxide fuel cells (hereinafter referred to as "SOFCs") have high efficiency and require no expensive catalyst such as platinum or the like. SOFCs, however, have a problem in that they operate at high temperatures, i.e., 800° C. to 1,000° C., at which components such as interconnectors or the like deteriorate readily.

To solve the above problem, medium-temperature SOFCs, which operate at temperatures of 600° C. or lower, are expected to be useful. Unfortunately, SOFCs that operate at low operating temperatures have a problem in that they have low efficiency and cannot provide the necessary power generation performance. Accordingly, there is a need for a solid electrolyte that has high efficiency and can provide the necessary power generation performance at low operating temperatures.

Solid electrolytes include oxygen-ion conducting solid electrolytes and proton-conducting solid electrolytes. The use of oxygen-ion conducting solid electrolytes has a problem in that oxygen ions combine with hydrogen on the fuel electrode to produce water, which dilutes the fuel and thus decreases the efficiency.

Proton-conducting solid electrolytes, such as yttrium-doped barium zirconate (hereinafter referred to as "BZY") or the like, which have low activation energy for carrier transportation and thus provide high proton conductivity at low temperatures, are expected to be useful as an alternative to oxygen-ion conducting solid electrolytes. The use of proton-conducting solid electrolytes also eliminates the above problem with oxygen-ion conducting solid electrolytes.

CITATION LIST

Patent Literature

PTL 1: Japanese Patent No. 3733030

SUMMARY OF INVENTION

Technical Problem

To improve the power generation efficiency of a medium-temperature SOFC, a larger amount of fuel gas needs to be supplied to and reacted on the fuel electrode. To improve the reaction efficiency of the gas on the fuel electrode, a porous fuel electrode may be used to provide a larger area for the fuel gas to react.

The fuel electrode, however, requires a certain density to provide the necessary bonding strength to the solid electrolyte layer. The component that forms the fuel electrode is also often used as a substrate on which the solid electrolyte layer is formed. Thus, it is difficult to form a porous fuel electrode with high porosity.

To reduce the size of the fuel cell and also improve the efficiency of the solid electrolyte laminate, it is preferred to minimize the thickness of the solid electrolyte laminate. A thin solid electrolyte laminate, however, has low mechanical strength and is therefore easily broken.

An object of the present invention, which has been made to solve the foregoing problems, is to provide a solid electrolyte laminate that allows a large amount of gas to be supplied to a fuel electrode while having improved strength and a method for manufacturing such a solid electrolyte laminate.

Solution to Problem

An embodiment of the present invention is a solid electrolyte laminate including a solid electrolyte layer, a first electrode layer disposed on one side of the solid electrolyte layer, and a second electrode layer disposed on another side of the solid electrolyte layer. At least the first electrode layer, which forms a fuel electrode, includes a bonding layer bonded to the solid electrolyte layer and a porous layer having continuous pores and integrally formed on the bonding layer.

In one embodiment of the present invention, at least the first electrode layer, which forms the fuel electrode, includes the bonding layer and the porous layer. The bonding layer has a higher density than the porous layer and can provide sufficient bonding strength to the solid electrolyte layer.

The porous layer has continuous pores and has a sufficient porosity to permit a fuel gas to flow easily. This allows the fuel gas to flow through the porous layer so that a large amount of fuel gas reacts on the first electrode layer (fuel electrode).

Even if the bonding layer is thinner than a conventional fuel electrode, the porous layer can function as a reinforcing layer to provide sufficient strength. This improves the strength of the solid electrolyte laminate.

The bonding layer and the porous layer are preferably made of a metal material. If these layers are made of a metal material, they can be easily integrally bonded together. A porous layer made of a metal material can also form a deformable electrode. Such a porous layer can function as a protective layer to alleviate not only a mechanical shock, but also a thermal shock or external shock. In the event of a failure of a fuel cell, oxygen might flow to and oxidize the anode, which would experience a volume change and thus damage the solid electrolyte laminate. If a nickel-iron metal anode is used, however, iron is quickly oxidized to form a dense surface layer, which inhibits internal oxidation of nickel so that little volume change occurs.

To provide a fuel cell that operates efficiently in the medium temperature range, i.e., 600° C. or lower, a proton-conducting solid electrolyte is preferably used for the solid electrolyte layer. If a proton-conducting solid electrolyte is used, the reaction on the anode produces no water, and therefore, the porous anode forms no water discharge path. Thus, the solid electrolyte can be more efficiently supplied with the fuel gas than an oxygen-ion conducting solid electrolyte. Examples of proton-conducting solid electrolytes that can be used include those made of materials such as yttrium-doped barium zirconate (BZY), yttrium-doped barium cerate (BCY), $BaZr_xCe_{1-x-y}Y_yO_{3-\delta}$ (BZCY), and the like.

In one embodiment of the present invention, oxygen-ion conducting solid electrolytes can be used, including YSZ, GDC, LSGM, SSZ, and the like. For example, such oxygen-ion conducting solid electrolytes can be used in combination with an anode made of nickel-iron.

Examples of materials that can be used for the second electrode layer (cathode) include lanthanum strontium cobalt oxide (LSC), lanthanum strontium iron cobalt oxide (LSCF), barium strontium cobalt iron oxide (BSCF), lanthanum strontium manganese oxide (LSM), and the like.

Examples of materials that can be used for the bonding layer of the first electrode layer include nickel, iron-nickel, nickel-cobalt, nickel-copper, iron-cobalt, iron-copper, copper-cobalt, and the like. The bonding layer can also be a porous layer of such a material. In this case, the bonding layer preferably has a porosity of 10% to 40%. A bonding layer having a porosity of less than 10% would not allow a sufficient amount of gas to be supplied to the solid electrolyte layer. A bonding layer having a porosity of more than 40% would crack readily.

Examples of materials that can be used for the porous layer of the first electrode layer include porous nickel, porous nickel-iron, porous nickel-chromium, porous nickel-tin, and the like. If the bonding layer and the porous layer are made of metal materials containing the same component, the bonding layer and the porous layer can be easily integrally bonded together. The porous layer preferably has a porosity of 90% or more. A porous layer having such a porosity provides a sufficient flowability of the fuel gas and sufficient laminate strength.

For example, the porous layer is preferably a porous nickel or nickel-iron layer having a backbone composed of an outer shell and a hollow space, a backbone composed of an outer shell and a conductive core, or a backbone composed of an outer shell, a hollow space, and a conductive core, and the backbone preferably forms an integrally continuous three-dimensional network structure.

The use of a porous layer having a three-dimensional network structure provides a higher porosity. This results in a lower gas flow resistance and thus allows a larger amount of fuel gas to flow through the pores and react on the first electrode layer. The three-dimensional network structure also has high mechanical strength and provides uniform strength over the entire porous layer. The porous layer can therefore function as a reinforcing layer for the laminate.

The backbone may be formed in any manner. For example, the backbone can be formed by depositing a plating or metal coating layer on the surface of a resin having a three-dimensional network structure and then removing the resin. If the outer shell of the backbone is made of a metal plating or coating layer, the backbone can be made significantly thin and uniform in thickness. Thus, a porous layer with high porosity and therefore low resistance to the flow of the fuel gas can be formed.

In one embodiment of the present invention, whereas at least the first electrode layer, which forms the fuel electrode, includes the porous layer, the second electrode layer, which functions as the air electrode, may have the same structure as the first electrode layer.

The above solid electrolyte laminate can be manufactured by a method including a step of manufacturing a laminate including the solid electrolyte layer, the bonding layer disposed on one side of the solid electrolyte layer, and the second electrode layer disposed on another side of the solid electrolyte layer; and a porous-layer forming step of forming the porous layer on the bonding layer.

The laminate including the solid electrolyte layer, the second electrode layer, and the bonding layer may be formed in any manner. For example, a compact for the solid electrolyte layer can be formed and used as a support to form the second electrode layer and the bonding layer thereon. Alternatively, a compact for the bonding layer can be formed and used as a support to form the solid electrolyte layer and the second electrode layer thereon.

The porous-layer forming step may be performed in any manner. For example, the porous-layer forming step can be performed by bonding a sheet of a porous metal to the bonding layer by reduction bonding. For example, reduction bonding is preferably performed in the temperature range of 600° C. to 700° C. Reduction bonding below the above temperature range would not allow sufficient grain growth, and the porous layer would therefore be prone to cracking because of its high porosity and low mechanical strength. Reduction bonding above the above temperature range would cause considerable shrinkage, and the solid electrolyte layer would therefore be prone to peeling. Alternatively, the porous-layer forming step can be performed by bonding the porous metal to the bonding layer by diffusion bonding, or can be performed by sintering a material such as a paste or the like containing nickel powder.

In one embodiment of the present invention, a fuel cell may include a plurality of solid electrolyte laminates stacked on top of each other and an interconnector disposed therebetween. In one embodiment of the present invention, the solid electrolyte laminates include a first electrode layer, which forms the anode, including a porous layer. The porous layer forms a passage through which the fuel gas flows in the fuel cell. This significantly increases the area for the fuel to react on the anode and thus improves the output of the fuel cell.

In one embodiment of the present invention, whereas the solid electrolyte is suitable for use with various types of fuel cells used in the temperature range of 600° C. or lower, it can also be used with fuel cells used in the temperature range above 600° C.

Advantageous Effects of Invention

A solid electrolyte laminate can be provided that allows a large amount of fuel gas to react on a fuel electrode to deliver high power generation efficiency in the medium temperature range, i.e., 600° C. or lower.

DESCRIPTION OF EMBODIMENTS

Figure 1:
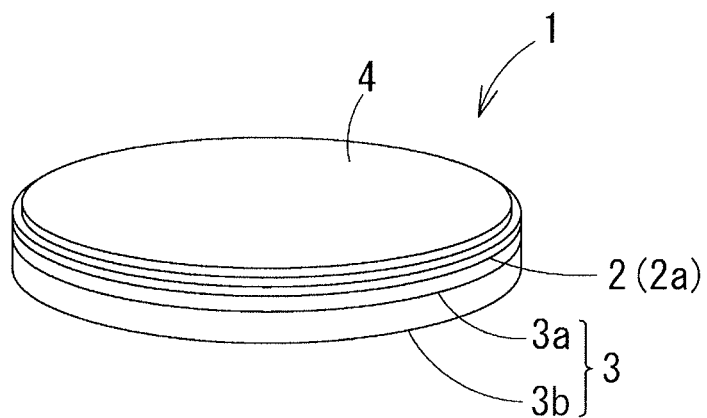
FIG. 1 is an overall perspective view of a solid electrolyte laminate according to an embodiment of the present invention.
Figure 2:
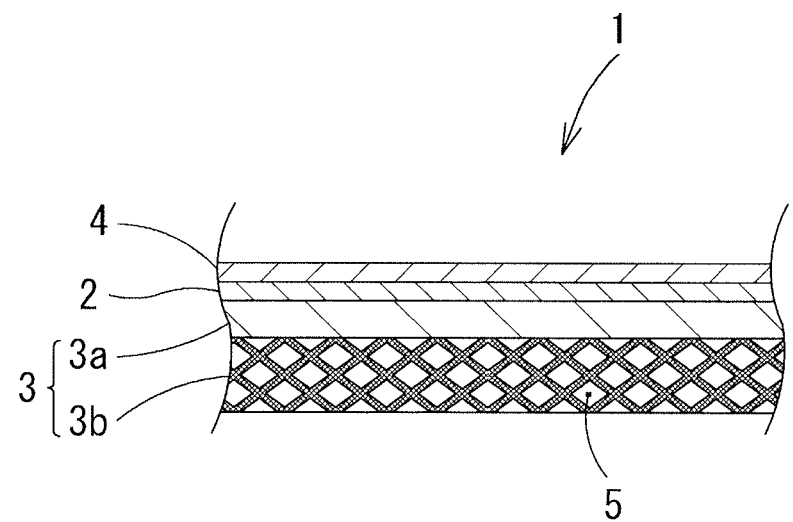
FIG. 2 is a partial enlarged sectional view of the solid electrolyte laminate shown in FIG. 1.

Embodiments of the present invention will now be described with reference to the drawings.

A solid electrolyte laminate 1 for a fuel cell according to a first embodiment includes a solid electrolyte layer 2, a first electrode layer 3 formed on one side of the solid electrolyte layer, and a second electrode layer 4 formed on the other side of the solid electrolyte layer.

The solid electrolyte layer 2 according to this embodiment is a layer of a proton-conducting yttrium-doped barium zirconate (hereinafter "BZY") solid electrolyte 2a. The solid electrolyte layer 2, however, may be made of any material. For example, the solid electrolyte layer 2 may be an oxygen-ion conducting solid electrolyte layer.

The solid electrolyte layer 2 may have any thickness within the range of 10 to 500 μm.

The first electrode layer 3 includes a bonding layer 3a bonded to the solid electrolyte layer 2 and a porous layer 3b having continuous pores and is configured to function as a fuel electrode (anode).

The bonding layer 3a is formed by sintering an electrode material made from nickel and iron powders and has fine pores through which a fuel gas can flow. To provide the necessary bonding strength to the solid electrolyte layer 2, the bonding layer 3a has a porosity of 10% to 40%. Thus, it is difficult to react a large amount of fuel gas on the bonding layer 3a.

To overcome the above disadvantage, the bonding layer 3a in this embodiment is integrally formed on the porous layer 3b. The porous layer 3b has continuous pores 5 and has high porosity to permit the fuel gas to flow easily. For example, the porous layer 3b preferably has a porosity of 90% or more so that it has low resistance to the flow of the fuel gas and allows the anode reaction to occur sufficiently.

In this embodiment, the porous layer 3b is a porous layer of nickel or a nickel-iron alloy. If the porous layer 3b is made of the same material as the bonding layer 3a, the porous layer 3b and the bonding layer 3a can be easily integrally bonded together to form a first electrode layer 3 that functions integrally as the anode.

A porous layer 3b made of a metal material also has high mechanical strength and thermal strength. Such a porous layer 3b can function as a reinforcing layer. If the porous layer 3b functions as a reinforcing layer, the bonding layer 3a can be made thinner than a conventional fuel electrode without a decrease in the strength of the solid electrolyte laminate.

A porous layer 3b made of a metal material is also highly deformable in response to an external shock. Such a porous layer 3b can function as a protective layer during assembly or handling.

The porous layer 3b may have any structure. For example, the porous layer 3b is preferably a porous nickel or nickel-iron alloy layer having a backbone composed of an outer shell and a hollow space, a backbone composed of an outer shell and a conductive core, or a backbone composed of an outer shell, a hollow space, and a conductive core, and the backbone preferably forms an integrally continuous three-dimensional network structure.

The use of a porous layer 3b having a three-dimensional network structure provides a higher porosity. This results in a lower gas flow resistance and thus allows a larger amount of fuel gas to flow through the pores and react on the first electrode layer. The three-dimensional network structure also has high mechanical strength and provides uniform strength over the entire porous layer 3b. The porous layer 3b can therefore function as a reinforcing layer and protective layer for the laminate.

The backbone may be formed in any manner. For example, the backbone can be formed by depositing a nickel or nickel-iron plating or metal coating layer on the surface of a resin having a three-dimensional network structure and then removing the resin. If the outer shell of the backbone is made of a metal plating or coating layer, the backbone can be made significantly thin and uniform in thickness. Thus, a porous layer with high porosity and therefore low resistance to the flow of the fuel gas can be formed.

The second electrode layer 4 according to this embodiment may be made of any material. For example, if the proton-conducting solid electrolyte 2a is used for the solid electrolyte layer 2, examples of materials that can be used for the second electrode layer 4 include lanthanum strontium cobalt oxide (LSC), lanthanum strontium iron cobalt oxide (LSCF), barium strontium cobalt iron oxide (BSCF), lanthanum strontium manganese oxide (LSM), and the like.

An example method for manufacturing the solid electrolyte laminate 1 will now be described.

In one embodiment of the present invention, the solid electrolyte is formed by a solid-phase reaction. To form a BZY solid electrolyte layer 2, 62% by weight $BaCO_3$, 31% by weight $ZrO_3$, and 7% by weight $Y_2O_3$ are mixed together as raw materials and are ball-milled in a first pulverization step to prepare a homogeneous mixture of the raw materials. The mixture is then heat-treated at 1,000° C. for about 10 hours in a first heat treatment step. The powder material subjected to the first heat treatment step is then ball-milled in a second pulverization step. The material may be pulverized to any degree in the pulverization steps. Preferably, the powder is pulverized to an average particle size of 355 μm or less.

After the second pulverization step, the mixed powder is compacted into a predetermined shape in a compaction molding step. The compaction molding step may be performed in any manner. For example, the mixed powder may be compacted into a disk-shaped compact by uniaxial compaction molding.

The resulting compact is heat-treated at about 1,300° C. for about 10 hours in a second heat treatment step to dissolve the individual component powders and uniformly disperse the individual components. In one embodiment of the present invention, the solid electrolyte 2a needs to have a uniform structure in which the individual components are uniformly dispersed and dissolved to allow low-temperature operation. Accordingly, the compact subjected to the second heat treatment step is pulverized in a third pulverization step. Optionally, the compaction molding step, the second heat treatment step, and the third pulverization step can be repeated to prepare a material in which the individual components are more uniformly dispersed and dissolved. The individual component powders are determined to be uniformly dispersed and dissolved if there is only a peak corresponding to BZY in component analysis data obtained with an X-ray diffractometer (XRD).

After the third pulverization step, the pulverized material in which the individual components are uniformly dispersed and dissolved is compacted into the required solid electrolyte shape in a second compaction molding step. The second compaction molding step may be performed in any manner. For example, the second compaction molding step can be performed by compression pressing. By the second compaction molding step, a sheet-shaped compact having a thickness of 100 to 500 μm is formed.

The sheet-shaped compact is then sintered in a sintering step by heat treatment at a temperature of 1,400° C. to 1,600° C. in an oxygen atmosphere for at least 20 hours to obtain a sintered sheet-shaped compact for the solid electrolyte layer 2 for a fuel cell.

A BZY solid electrolyte layer manufactured by the above method exhibits a characteristic change in lattice constant in the temperature range of 200° C. to 500° C. The characteristic change in lattice constant is accompanied by a change in thermal expansion coefficient. Thus, during the sintering of the electrode layers 3 and 4 formed on the solid electrolyte manufactured by the above method, the change in thermal expansion coefficient produces a large shear stress between the solid electrolyte layer 2 and the electrode layers 3 and 4. This causes problems such as cracking of the solid electrolyte layer 2 and peeling of the electrode layers 3 and 4 from the solid electrolyte layer 2.

To solve this problem, a third heat treatment step is performed in this embodiment. The third heat treatment step can be performed by maintaining the sintered sheet-shaped solid electrolyte at a temperature of 400° C. to 1,000° C. for 5 to 30 hours.

The third heat treatment step avoids the characteristic change in lattice constant in the temperature range around 400° C. and thus allows the rate of increase in lattice constant with changing temperature to be substantially constant in the range of 100° C. to 1,000° C.

The solid electrolyte formed by the above method was examined by electron microscopy. The solid electrolyte subjected to the third heat treatment step had an average crystal grain size of 1 µm. This crystal grain size demonstrates that high proton conductivity can be achieved without an increase in grain boundary density. In this embodiment, the solid electrolyte 2a has a proton conductivity of 1 to 60 mS/cm at 400° C. to 800° C.

The solid electrolyte 2a also had a lattice constant of 4.218 to 4.233 Å at room temperature. The lattice constant at room temperature can be measured to estimate the yttrium content and the lattice constant around 400° C. and thereby predict the properties such as the thermal expansion coefficient or the like. This avoids defective products.

The rate of increase in the lattice constant of the solid electrolyte with changing temperature is preferably $3.3 \times 10^{-5}$ to $4.3 \times 10^{-5}$ Å/° C. in the range of 100° C. to 1,000° C. This results in an average thermal expansion coefficient of $5 \times 10^{-6}$ to $9.8 \times 10^{-6}$ 1/K in the range of 100° C. to 1,000° C.

The sintering step and the third heat treatment step can be performed separately or continuously.

After the third heat treatment step, the bonding layer 3a for the first electrode layer is formed on one side of the sheet-shaped solid electrolyte, and the second electrode layer 4 is formed on the other side of the sheet-shaped solid electrolyte.

In this embodiment, nickel-doped yttrium-doped barium zirconate (Ni—BZY) is used for the bonding layer 3a. The bonding layer 3a may have a nickel content of 30% to 70%. The BZY is preferably a powder of the solid electrolyte subjected to the third heat treatment according to this embodiment.

The second electrode material is an electrode material made of LSC or LSCF. For example, the LSC may be a commercial product represented by $La_{0.6}Sr_{0.4}CoO_x$. The LSCF may be a known material represented by $La_{0.6}Sr_{0.4}Co_{0.2}Fe_{0.8}O_x$.

The above electrode materials can be deposited to a predetermined thickness on either side of the sheet-shaped solid electrolyte formed by the above method of manufacture and can then be sintered by heating to the required temperature to form a laminate. The electrodes may have any thickness. For example, the bonding layer 3a can be deposited to a thickness of 10 to 50 µm, whereas the second electrode layer 4 can be deposited to a thickness of 10 to 50 µm. Thereafter, the bonding layer 3a and the second electrode layer 4 can be heated to and maintained at the sintering temperature of the materials for the electrode layers for a predetermined period of time to form a laminate including the bonding layer 3a and the second electrode layer 4 disposed on either side of the solid electrolyte layer 2. The electrode-layer sintering step of sintering the bonding layer 3a and the electrode-layer sintering step of sintering the second electrode layer 4 can be performed simultaneously or separately.

The temperature required to sinter the bonding layer 3a and the second electrode layer 4 is about 1,000° C. In this embodiment, in which the solid electrolyte is subjected to the third heat treatment, the rate of increase in lattice constant with changing temperature is constant in the temperature range of 100° C. to 1,000° C., and accordingly, the thermal expansion coefficient is constant. Therefore, during the sintering of the bonding layer 3a and the second electrode layer 4, no large shear stress or strain due to the difference in thermal expansion coefficient occurs in the interface between the solid electrolyte layer 2 and the bonding layer 3a or the second electrode layer 4. Thus, the solid electrolyte layer and the electrode layers do not crack, and the electrode layers do not peel. In addition, because the internal stress or the like, for example, is reduced, a highly durable solid electrolyte laminate can be formed.

Although the bonding layer 3a and the second electrode layer 4 are formed after the solid electrolyte layer 2 is formed in the embodiment described above, the solid electrolyte layer 2 and the second electrode layer 4 can be formed after the bonding layer 3a is formed. In this case, it is desirable that the bonding layer 3a have a thickness of 100 to 1,000 µm to provide sufficient strength. The solid electrolyte layer 2 can be formed by depositing the powder material for the solid electrolyte on the bonding layer 3a, for example, by screen printing or the like, and then sintering the powder material. The second electrode layer 4 is similarly formed.

The porous layer 3b is then formed on the bonding layer 3a in a porous-layer forming step.

In this embodiment, a sheet of porous nickel or nickel-iron alloy is bonded by reduction bonding. Reduction bonding can be performed, for example, by laminating the material and heat-treating it at 850° C. in a reducing atmosphere such as hydrogen, $NH_3$ or the like for three hours. The porous-layer forming step can also be performed by other processes, including diffusion bonding.

The porous material for the porous layer 3b at least has continuous pores and preferably has a porosity of 90% or more. The porous material may be formed in any manner. For example, the porous material is preferably porous nickel or nickel-iron having a backbone composed of an outer shell and a hollow space, a backbone composed of an outer shell and a conductive core, or a backbone composed of an outer shell, a hollow space, and a conductive core, and the backbone preferably forms an integrally continuous three-dimensional network structure.

The use of a porous layer having a three-dimensional network structure provides a higher porosity. This results in a lower gas flow resistance and thus allows a larger amount of fuel gas to flow through the pores and react on the first electrode layer. The three-dimensional network structure also has high mechanical strength and provides uniform strength over the entire porous layer. The porous layer can therefore function as a reinforcing layer and protective layer for the laminate.

The backbone may be formed in any manner. For example, the backbone can be formed by depositing a nickel plating or nickel coating layer on the surface of a resin having a three-dimensional network structure and then removing the resin. If the outer shell of the backbone is made of a metal plating or coating layer, the backbone can be made significantly thin and uniform in thickness. Thus, a porous layer with high porosity and therefore low resistance to the flow of the fuel gas can be formed.

The above steps provide a solid electrolyte laminate 1 including a first electrode layer (anode) composed of the bonding layer 3a and the porous layer 3b.

Figure 3:
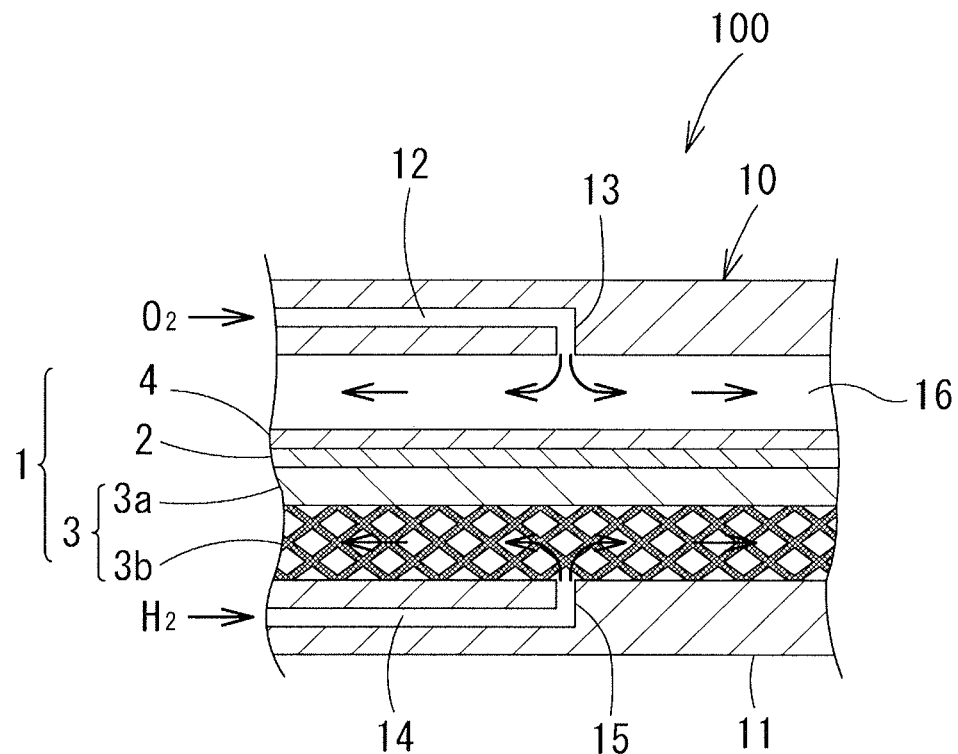
FIG. 3 is a partial enlarged sectional view of a fuel cell including a solid electrolyte laminate according to an embodiment of the present invention.

FIG. 3 shows a cross-section of a main section of a fuel cell including the solid electrolyte laminate formed by the above method. In the embodiment shown in FIG. 3, interconnectors 10 and 11 for supplying a fuel gas $H_2$ and oxygen $O_2$ and separating individual solid electrolyte laminates are disposed on either side of the solid electrolyte laminate 1. Although the embodiment shown in FIG. 3 illustrates a fuel cell including a single solid electrolyte laminate 1, a plurality of solid electrolyte laminates may actually be stacked in the thickness direction with the interconnectors 10 and 11 therebetween.

The interconnector 10 is disposed opposite the second electrode layer 4 with an airflow space 16 therebetween. The interconnector 10 has an air passage 12. The interconnector 10 is configured such that air can be supplied through the air passage 12 and an outlet 13 to the airflow space 16. The interconnector 11 is disposed opposite the first electrode layer 3 so that the interconnector 11 is layered on the porous layer 3b. The interconnector 11 has a fuel cell passage 14 and is configured such that the fuel gas $H_2$ is injected from an outlet 15 into the porous layer 3b.

In the thus-configured fuel cell 100, the fuel gas $H_2$ is directly supplied to and flows through the porous layer 3b that forms the first electrode layer 3. This allows the fuel gas $H_2$ to react efficiently on the first electrode layer 3. In addition, the porous layer 3b has high porosity and thus allows a large amount of fuel gas to react on the first electrode layer 3 without impeding the flow of the fuel gas.

The porous layer 3b is held in contact with the inner surface of the interconnector 11. This eliminates the need for components such as spacers or the like for defining a space between the solid electrolyte laminate 1 and the interconnector 11. In addition, the porous layer 3b is deformable and can therefore absorb a dimensional change due to thermal expansion between the interconnector 11 and the solid electrolyte laminate 1. Thus, a highly durable fuel cell can be constructed without a thermal stress in the solid electrolyte laminate 1.

Although only the first electrode layer 3 includes a porous layer in the embodiment shown in FIG. 3, the second electrode layer 4 may also include a porous layer provided by bonding a porous material.

Figure 4:
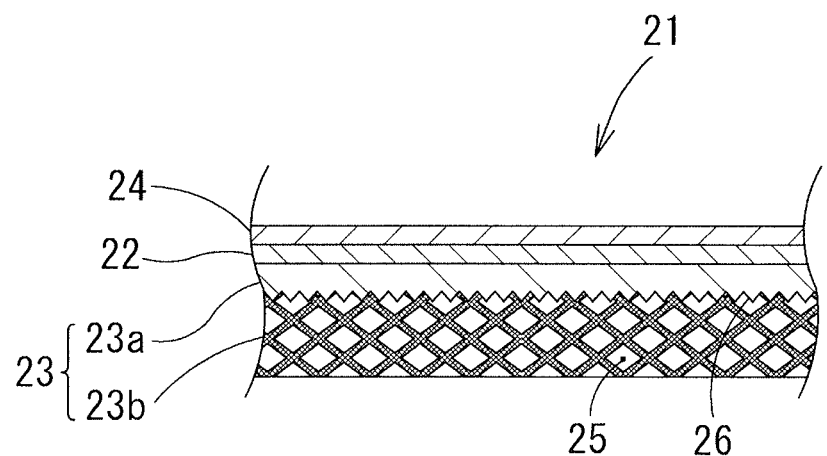
FIG. 4 is a partial enlarged sectional view of a solid electrolyte laminate according to another embodiment of the present invention.

FIG. 4 shows a solid electrolyte laminate 21 according to a second embodiment. The solid electrolyte laminate 21 includes a solid electrolyte layer 22, a first electrode layer 23 formed on one side of the solid electrolyte layer, and a second electrode layer 24 formed on the other side of the solid electrolyte layer. The first electrode layer 23 includes a bonding layer 23a and a porous layer 23b, and the porous layer 23b has continuous pores 25. In this embodiment, the bonding layer 23a has surface asperities 26, which increase the bonding area between the bonding layer 23a and the porous layer 23b, and the porous layer 23b is layered on and bonded to these asperities 26.

The use of the above structure not only increases the bonding strength between the bonding layer 23a and the porous layer 23b, but also increases the transfer area from the porous layer 23b to the bonding layer 23a. This increases the permeability for protons migrating from the porous layer 23b into the bonding layer 23a, thus improving the efficiency of the fuel cell.

The scope of the present invention is not limited to the above embodiments. The embodiments disclosed herein are illustrative in all aspects and should not be construed as limiting. The scope of the present invention is defined by the claims, rather than by the above meaning, and all changes within the claims and the meaning and range of equivalents thereof are intended to be embraced therein.

INDUSTRIAL APPLICABILITY

A large amount of fuel gas can be supplied to and reacted on an electrode to increase the efficiency of a fuel cell in the medium temperature range.

REFERENCE SIGNS LIST 1 solid electrolyte laminate
2 solid electrolyte layer
3 first electrode layer (anode layer)
3a bonding layer
3b porous layer
4 second electrode layer (cathode layer)

The invention claimed is:

1. A solid electrolyte laminate comprising a solid electrolyte layer, a first electrode layer disposed on one side of the solid electrolyte layer, and a second electrode layer disposed on another side of the solid electrolyte layer,
   wherein at least the first electrode layer, which forms a fuel electrode, includes a bonding layer bonded to the solid electrolyte layer and a porous layer having continuous pores and integrally formed on the bonding layer,
   wherein the bonding layer has fine pores,
   wherein the bonding layer has a porosity of 10% to 40%,
   wherein the bonding layer has a thickness of 100 µm to 1000 µm,
   wherein the bonding layer comprises a nickel-iron alloy having a nickel content of 30% to 70% by weight; and
   wherein the porous layer comprises porous nickel or a porous nickel-iron alloy, and has (i) a backbone comprising an outer shell and a hollow space, (ii) a backbone comprising an outer shell and a conductive core, or (iii) a backbone comprising an outer shell, a hollow space, and a conductive core, the backbone forming an integrally continuous three-dimensional network structure.

2. The solid electrolyte laminate according to claim 1, wherein
   the solid electrolyte layer comprises a proton-conducting solid electrolyte, and
   the first electrode layer functions as an anode.

3. The solid electrolyte laminate according to claim 1, wherein the porous layer has a porosity of 90% or more.

4. A method for manufacturing the solid electrolyte laminate according to claim 1, the method comprising:
   a step of manufacturing a laminate including the solid electrolyte layer, the bonding layer disposed on one side of the solid electrolyte layer, and the second electrode layer disposed on another side of the solid electrolyte layer; and
   a porous-layer forming step of forming the porous layer on the bonding layer.

5. The method for manufacturing the solid electrolyte laminate according to claim 4, wherein the porous-layer forming step is performed by bonding a porous metal to the bonding layer by reduction bonding.

6. The method for manufacturing the solid electrolyte laminate according to claim 4, wherein the porous-layer forming step is performed by bonding a porous metal to the bonding layer by diffusion bonding.

7. A fuel cell comprising a plurality of solid electrolyte laminates according to claim 1 stacked on top of each other and an interconnector disposed therebetween.

8. The fuel cell according to claim 7, wherein the porous layer forms a fuel gas passage.

9. The solid electrolyte laminate according to claim 1, wherein the bonding layer has a surface asperities on the side bonded to the porous layer.

* * * * *